No. 606,922.  
O. GATES.  
CATTLE TIE.  
(Application filed May 13, 1897. Renewed Dec. 23, 1897.)  
Patented July 5, 1898.  
(No Model.)
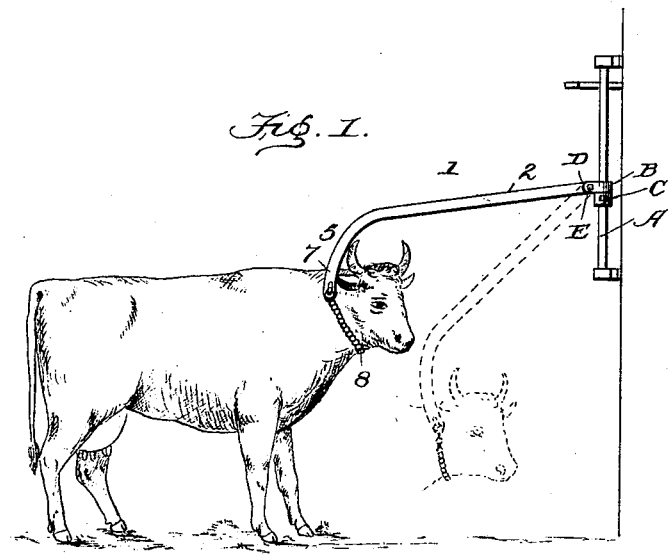
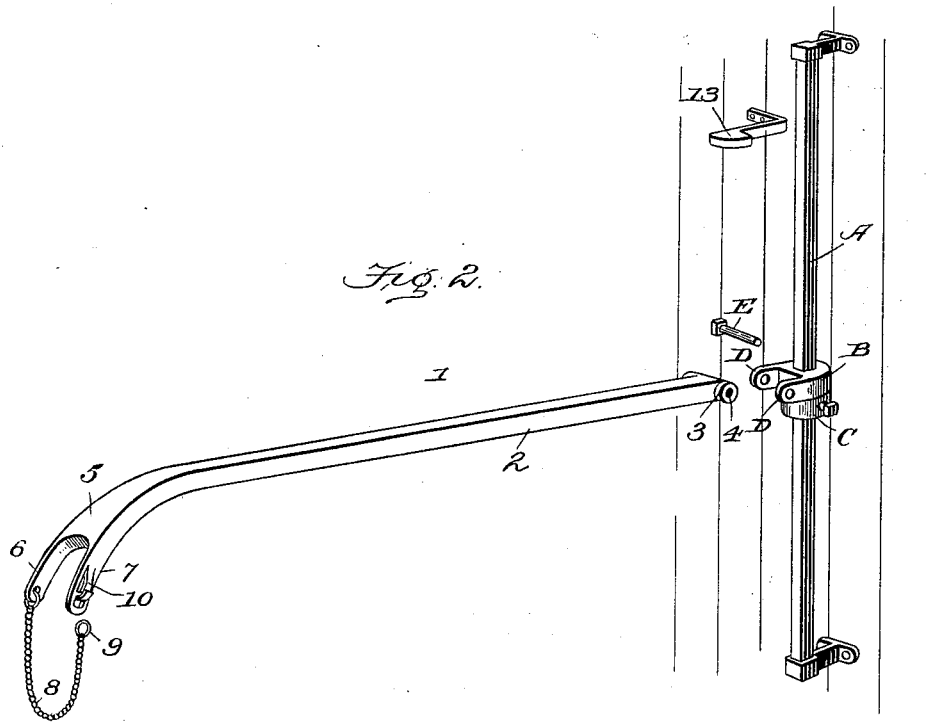
WITNESSES:  
Edwin L. Bradford  
J. H. McPherson Jr.
INVENTOR  
Otus Gates  
BY  
R. S. A. B. Lacey  
ATTORNEYS.

UNITED STATES PATENT OFFICE.

OLUS GATES, OF ESTHERVILLE, IOWA.

CATTLE-TIE.

SPECIFICATION forming part of Letters Patent No. 606,922, dated July 5, 1898.

Application filed May 13, 1897. Renewed December 23, 1897. Serial No. 663,263. (No model.)

*To all whom it may concern:*

Be it known that I, OLUS GATES, a citizen of the United States, residing at Estherville, in the county of Emmett and State of Iowa, have invented certain new and useful Improvements in Cattle-Ties; and I do hereby declare the following to be a full, clear, and exact description of the invention, such as will enable others skilled in the art to which it appertains to make and use the same.

My invention has relation to improvements in cattle-ties, and more particularly to that class of ties employed to secure the animal when confined to the stall; and the object is to provide a simple, durable, and effective device of this class.

To this end the novelty consists in the construction, combination, and arrangement of the same, as will be hereinafter more fully described, and particularly pointed out in the claims.

In the accompanying drawings the same reference characters indicate the same parts of the invention.

Figure 1 is a side view of my improved cattle-tie as it appears in use on an animal standing in a stall and shown in dotted lines when the animal is lying down. Fig. 2 is a detached perspective view of the tie.

1 represents a rectangular bar formed with a straight shank 2, the forward end of which is provided with a horizontal hub 3, having a transverse orifice 4. The opposite end of said bar terminates in a downwardly-curved arm 5, formed with longitudinal parallel jaws 6 7, one end of a strap chain-loop 8 being fixed to the end of the jaw 6, and its opposite end is provided with a ring 9, which detachably engages a snap-hook 10, formed integral with the jaw 7. When the animal is confined in the stall, the bar permits a free movement of the animal's head in every direction, the curved arm 5 allowing it to conveniently raise its head to feed from the usual hayrack. (Not shown.)

A represents a vertical rectangular standard fixed in the head of the stall, and B represents a bracket which has a free vertical movement on said standard, its downward movement being limited by an adjustable collar C.

The bracket B is provided with two horizontal arms D D, through which the bolt E engages the orifice 4 in the hub 3 to pivotally secure the bar in place.

By raising or lowering the collar C the bar 1 may be adjusted to suit the height of different animals.

This construction permits a free vertical movement of the bar, but prevents any lateral movement, thereby confining the animal to its proper position and preventing it from interfering with its neighbors when more than one animal is confined in the same stall, and for this purpose it answers all the requirements of a partition to separate them.

A very important sanitary advantage gained by this manner of confining the animal is the fact that when the animal is standing the bar extends at a right angle or approximately horizontal from the head of the stall, and in which position the animal naturally voids its excrement, and when it desires to lie down it must step three or four feet forward, thus compelling it to approach nearer to the head of stall and entirely clear of the droppings, thereby preventing all danger of the refuse matter contaminating the udder.

In practice I provide a projecting springhook 13, which is permanently fixed to the head of the stall, with its free end projecting into the path of the bar 1, so that when the latter is not in use the bar may be conveniently suspended and therefore out of the way of the attendant in the usual duties of cleaning the stall.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. An animal-tie comprising the rectangular bar 1 provided with the curved arm 5 formed with longitudinal parallel jaws 6 and 7 one of which is provided with the integral snap-hook 10, and the chain-loop 8, fixed at one end to one of said jaws, and having its free end provided with a ring or link adapted to detachably engage said snap-hook on the opposite jaw, substantially as shown and described.

2. An animal-tie, comprising the rectangular bar 1, provided with the horizontal hub 3, having the transverse orifice 4, and the curved arm 5 formed with the longitudinal parallel jaws 6 7, connected by the chain-loop 8, substantially as shown and described.

3. An animal-tie, comprising the rectangular bar 1 provided with the hub 3 and transverse orifice 4 and having the curved arm 5 formed with the longitudinal parallel jaws 6 and 7 connected by the chain-loop 8, in combination with the vertical rectangular fixed standard A, the collar C adjustably secured on said standard, the bracket B encompassing said standard and provided with the parallel arms D D and the bolt E, connecting the bar 1 and bracket A, substantially as shown and described.

In testimony whereof I affix my signature in presence of two witnesses.

OLUS GATES.

Witnesses:
JOHN JOHNEK,
JAS. P. KIRBY.